(12) United States Patent
Morimoto et al.

(10) Patent No.: US 9,495,445 B2
(45) Date of Patent: Nov. 15, 2016

(54) DOCUMENT SORTING SYSTEM, DOCUMENT SORTING METHOD, AND DOCUMENT SORTING PROGRAM

(71) Applicant: UBIC, Inc., Minato-ku, Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP)

(73) Assignee: UBIC, Inc., Minato-Ku, Tokyo (JP)

( * ) Notice: Subject to any disclaimer, the term of this patent is extended or adjusted under 35 U.S.C. 154(b) by 0 days.

(21) Appl. No.: 14/866,016

(22) Filed: Sep. 25, 2015

(65) Prior Publication Data

US 2016/0098478 A1 Apr. 7, 2016

Related U.S. Application Data

(63) Continuation of application No. 14/346,364, filed as application No. PCT/JP2013/059971 on Apr. 1, 2013, now Pat. No. 9,171,074.

(30) Foreign Application Priority Data

Mar. 30, 2012 (JP) ................. 2012-083072

(51) Int. Cl.
  *G06F 17/30* (2006.01)
  *G06Q 10/10* (2012.01)
  (Continued)

(52) U.S. Cl.
  CPC .......... *G06F 17/30675* (2013.01); *G06F 7/36* (2013.01); *G06F 17/30011* (2013.01);
  (Continued)

(58) Field of Classification Search
  CPC ............. G06F 17/30; G06F 17/30011; G06F 17/3053; G06F 17/30663
  USPC ................................................. 707/600–899
  See application file for complete search history.

(56) References Cited

U.S. PATENT DOCUMENTS

| 5,794,236 A | 8/1998 | Mehrle |
| 2006/0282415 A1 | 12/2006 | Shibata et al. |
| 2011/0184729 A1* | 7/2011 | Nam ................... G06F 17/2755 704/9 |

FOREIGN PATENT DOCUMENTS

| JP | 16-075995 | 3/1994 |
| JP | 2000-511671 | 9/2000 |

(Continued)

OTHER PUBLICATIONS

International Search Report dated May 7, 2013 for International Application No. PCT/JP2013/059971.

*Primary Examiner* — Isaac M Woo
(74) *Attorney, Agent, or Firm* — Lewis Roca Rothgerber Christie LLP

(57) ABSTRACT

It is possible to analyze digitized document information gathered to be provided as evidence in a legal action and to classify the document information to be easily accessible in the legal action. A document classification system includes a keyword database, a related term database, a first classification unit which extracts a document including a keyword recorded in the keyword database from document information and attaches a specific classification mark to the extracted document based on keyword-corresponding information, and a second classification unit which extracts a document including a related term recorded in the related term database from document information, to which the specific classification mark is not attached in the first classification unit, calculates a score based on an evaluated value of the related term included in the extracted document and the number of related terms, and attaches a predetermined classification mark to a document, for which the score exceeds a given value, among the documents including the related term based on the score and the related term-corresponding information.

10 Claims, 14 Drawing Sheets

(51) Int. Cl.
  *G06F 7/36* (2006.01)
  *G06Q 50/18* (2012.01)

(52) U.S. Cl.
  CPC ..... *G06F17/3053* (2013.01); *G06F 17/30663* (2013.01); *G06F 17/30707* (2013.01); *G06F 17/30722* (2013.01); *G06Q 10/10* (2013.01); *G06Q 50/18* (2013.01)

(56) References Cited

FOREIGN PATENT DOCUMENTS

| | | |
|---|---|---|
| JP | 2006-344010 | 12/2006 |
| JP | 2008-242639 | 10/2008 |
| JP | 2011-209931 | 10/2010 |
| JP | 2011-209930 | 10/2011 |
| JP | 2012-032859 | 2/2012 |

* cited by examiner

DOCUMENT SORTING SYSTEM, DOCUMENT SORTING METHOD, AND DOCUMENT SORTING PROGRAM

RELATED APPLICATION DATA

The present application is a continuation of U.S. application Ser. No. 14/346,364, filed Mar. 21, 2014, which is the United States national stage of International Application No. PCT/JP2013/059971, filed Apr. 1, 2013, which claims priority to Japanese Patent Application No. 2012-083072, filed Mar. 30, 2012, the entire contents of which are incorporated herein by reference.

TECHNICAL FIELD

The present invention relates to a document classification system, a document classification method, and a recording medium having recorded thereon a document classification program, and in particular, to a document classification system, a document classification method, and a recording medium having recorded thereon a document classification program for document information relating to a legal action.

BACKGROUND ART

In the related art, means or technology that gathers and analyzes equipment, data, and electronic records necessary for probing into the cause or investigation if there is if a crime or a legal dispute relating to a computer, such as unauthorized access or confidential information leakage, and that clarifies legal evidentiality has been suggested.

In particular, in a U.S. civil action, eDiscovery (electronic discovery) or the like is required, either the plaintiff or the defendant of the legal action is responsible for submitting associated digital information as evidence. For this reason, digital information recorded in a computer or a server should be submitted as evidence.

Presently, with rapid development and widespread use of IT and with most pieces of information created using a computer in business, a lot of digital information floods the company server.

For this reason, while preparing for submission of evidentiary materials to court, a mistake may be made where confidential digital information which is not necessarily associated with the legal action is included as an evidentiary material in the evidence disclosure. There may also be a problem in that confidential document information not associated with the legal action is submitted.

In recent years, technology relating to document information in a forensic system was suggested in PTL 1 to PTL 3. PTL 1 discloses a forensic system which designates a specific person from one or more users included in user information, only extracts digital document information accessed by the specific person based on access history information relating to the designated specific person, sets incidental information representing whether or not each document file of the extracted digital document information is associated with a legal action, and outputs the document file associated with the legal action based on the incidental information.

PTL 2 discloses a forensic system which displays recorded digital information, sets user identification information representing a plurality of document files are associated with any user among users included in user information, sets such that the set user identification information is recorded in a storage unit, designates one or more users, searches for a document file with the set user identification information corresponding to the designated user, sets incidental information representing whether or not the searched document file is associated with a legal action through a display unit, and outputs the document file associated with the legal action based on the incidental information.

PTL 3 discloses a forensic system which accepts the designation of at least one document file included in digital document information, accepts the language designation, to which a designated document file is translated, translates the designated document file in the designated language, extracts a common document file with the same content as the designated document file from the digital document information recorded in a recording unit, produces translation associated information representing that the extracted common document file is translated by incorporating the translation content of the translated document file, and outputs a document file associated with a legal action based on the translation associated information.

CITATION LIST

Patent Literature

[PTL 1] JP-A-2011-209930
[PTL 2] JP-A-2011-209931
[PTL 3] JP-A-2012-32859

SUMMARY OF INVENTION

Technical Problem

However, for example, in the forensic system of PTL 1 to PTL 3, the enormous amount of document information of the user using a plurality of computers and servers is gathered.

In regard to an operation to classify the enormous amount of digitized document information based on whether or not document information is valid as an evidentiary material in a legal action, there is a problem in that document information is visually confirmed by a user, called a reviewer, and thus, it is necessary to classify the document information piece by piece, spending lots of effort and cost.

Therefore, the invention has been accomplished in consideration of the above-described situation, and an object of the invention is to provide a document classification system, a document classification method, and a recording medium having recorded thereon a document classification program which automatically attaches a classification mark to document information after digitized document information is gathered, having an advantage of less burden in classifying out document information to be used in a legal action.

Solution to Problem

According to the invention, there is provided a document classification system which acquires digital information recorded in a plurality of computers or servers, analyzes document information having a plurality of documents included in the acquired digital information, and attaches a classification mark representing the degree of association with a legal action to the document for ease of use in the legal action, the document classification system including a keyword database which records a specific classification mark, a keyword described in a document, to which the specific classification mark is attached, and keyword-corresponding information representing the correspondence relationship between the specific classification mark and the keyword, a related term database which records a predetermined classification mark, a related term having words with a high appearance frequency in the document, to which the predetermined classification mark is attached, and related term-corresponding information representing the correspondence relationship between the predetermined classification mark and the related term, a first classification unit which extracts a document including the keyword recorded in the keyword database from the document information and attaches the specific classification mark to the extracted document based on the keyword-corresponding information, a second classification unit which extracts a document including the related term recorded in the related term database from the document information, to which the specific classification mark is not attached in the first classification unit, calculates a score based on an evaluated value of the related term included in the extracted document and the number of related terms, and attaches the predetermined classification mark to a document, for which the score exceeds a given value, among the documents including the related term based on the score and the related term-corresponding information, and a classification mark accepting unit which accepts the attachment of a classification mark from a user to a document, to which the predetermined classification mark is not attached in the second classification unit.

The term "classification mark" refers to an identifier which is used to classify a document, and represents the degree of association with a legal action for ease of use in the legal action. For example, when using the document information as evidence in the legal action, the classification mark may be attached based on the type of evidence.

The term "document" refers to data including one or more words. As an example of "document", an electronic mail, a presentation material, a spreadsheet material, a meeting material, a contract, an organization chart, a business plan, or the like may be used.

The term "word" refers to a set of minimum character strings having a meaning. For example, a sentence "A document refers to data including one or more words." includes words of "document", "one", "or more", "words", "including", "data", and "refers to".

The term "keyword" refers to a combination of one or a plurality of "words". Specifically, if a keyword which has a close relationship with a specific classification mark is included in a document, it can be said that a classification mark is determined uniquely. For example, if a legal action for patent infringement occurs, as "keyword" when a classification mark "important" is attached to a document with a high degree of association with the legal action, "patent publication number", "patent attorney", "infringer", and the like may be used.

The term "keyword-corresponding information" represents the correspondence relationship between a keyword and a specific classification mark. For example, if the classification mark "important" representing an important document in the legal action has a close relationship with the keyword "infringer", it can be said that "keyword-corresponding information" is information which manages the classification mark "important" and the keyword "infringer" in association with each other.

The term "related term" refers to a word, for which the evaluated value is equal to or greater than a given value, among words with a high appearance frequency in all documents, to which a predetermined classification mark is attached. For example, the appearance frequency refers to the ratio of appearance of a related term among the total number of words which appear in one document.

The term "evaluated value" refers to the amount of information of each word which is exhibited in a certain document. The "evaluated value" may be calculated based on the amount of transmitted information. For example, if a predetermined commodity name is attached as a classification mark, the "related term" may indicate the name of the technical field to which the commodity belongs, the country of sale of the commodity, similar commodity names, and the like. Specifically, the "related term" when the commodity name of a device which performs image coding processing is attached as a classification mark, "coding processing", "Japan", "encoder", and the like may be used.

The term "related term-corresponding information" represents the correspondence relationship between a related term and a classification mark. For example, if a classification mark "product A" which is a commodity name in a legal action has a related term "image coding" which is a function of the product A, it can be said that "related term-corresponding information" is information which manages the classification mark "product A" and the related term "image coding" in association with each other.

The term "score" refers to the quantitative evaluation of the relation with a specific classification mark in a certain document. For example, the "score" may be calculated by words which appear in a document, and an evaluated value of each word.

The document classification system of the invention may extract words which frequently appear in documents, to which a common classification mark is attached by the user, may analyze the types of the extracted words, an evaluated value of each word, and trend information of the number of appearances of the extracted words per document, and may perform the attachment of the common classification mark for a document having the same trend as the analyzed trend information among documents for which a classification mark is not accepted the classification mark accepting unit.

The term "trend information" represents the degree of similarity between each document and a document, to which a classification mark is attached, and is represented by the degree of association with a predetermined classification mark based on the types of the words included in each document, the number of appearances, and the evaluated value of each word. For example, if each document and a document, to which the predetermined classification mark is attached, are similar regarding the degree of association with the predetermined classification mark, it is considered that the two documents have the same trend information. Even if the types of the words to be included are different from each other, a document which includes words having the same evaluated value with the same number of appearances may be considered as a document having the same trend.

The document classification system of the invention may further include a quality checking unit which determines a classification mark to be attached based on the analyzed trend information for a document, to which a classification mark is attached by the user, compares the determined classification mark with the classification mark attached by the user, and tests validity.

In the document classification system of the invention, the first classification unit may select a classification mark to be attached based on an evaluated value of the keyword and the number of appearances for a document including a plurality of keywords.

In the document classification system of the invention, the second classification unit may recalculate the evaluated value of the related term using the calculated score and may perform weighting on the evaluated value of the related term which frequency appears in the document, for which the score exceeds the given value.

According to the invention, there is provided a document classification method which acquires digital information recorded in a plurality of computers or servers, analyzes document information having a plurality of documents included in the acquired digital information, and attaches a classification mark representing the degree of association with a legal action to the document for ease of use in the legal action, in which a keyword database records a specific classification mark, a keyword described in a document, to which the specific classification mark is attached, and keyword-corresponding information representing the correspondence relationship between the specific classification mark and the keyword, a related term database records a predetermined classification mark, a related term having words with a high appearance frequency in the document, to which the predetermined classification mark is attached, and related term-corresponding information representing the correspondence relationship between the predetermined classification mark and the related term, and the document classification method causes a computer to execute extracting a document including the recorded keyword from the document information and attaching a specific classification mark to the extracted document based on the keyword-corresponding information, extracting a document including the recorded related term from the document information, to which the specific classification mark is not attached, calculating a score based on an evaluated value of the related term included in the extracted document and the number of related terms, and attaching the predetermined classification mark to a document, for which the score exceeds a given value, among the documents including the related term based on the score and the related term-corresponding information, and accepting the attachment of a classification mark from a user to a document, to which the predetermined classification mark is not attached.

According to the invention, there is provided a recording medium having recorded thereon a document classification program, which acquires digital information recorded in a plurality of computers or servers, analyzes document information having a plurality of documents included in the acquired digital information, and attaches a classification mark representing the degree of association with a legal action to the document for ease of use in the legal action, the document classification program causing a computer to implement a function of recording a specific classification mark, a keyword described in a document, to which the specific classification mark is attached, and keyword-corresponding information representing the correspondence relationship between the specific classification mark and the keyword, a function of recording a predetermined classification mark, a related term having words with a high appearance frequency in the document, to which the predetermined classification mark is attached, and related term-corresponding information representing the correspondence relationship between the predetermined classification mark and the related term, a function of extracting a document including the recorded keyword from the document information and attaching a specific classification mark to the extracted document based on the keyword-corresponding information, a function of extracting a document including the recorded related term from the document information, to which the specific classification mark is not attached, calculating a score based on an evaluated value of the related term included in the extracted document and the number of related terms, and attaching the predetermined classification mark to a document, for which the score exceeds a given value, among the documents including the related term based on the score and the related term-corresponding information, and a function of accepting the attachment of a classification mark from a user to a document, to which the predetermined classification mark is not attached.

Advantageous Effects of Invention

The document determination system, the document determination method, and the recording medium having recorded thereon the document determination program of the invention include the first classification unit which extracts a document including a keyword recorded in the keyword database from document information and attaches a specific classification mark to the extracted document based on keyword-corresponding information of each keyword, and the second classification unit which extracts a document including a related term recorded in the related term database from the document information, to which a specific classification mark is not attached in the first classification unit, calculates a score based on an evaluated value of the related term included in the extracted document and the number of related terms, and attaches a predetermined classification mark to a document, for which the score exceeds a given value, among the documents including the related term based on the score and related term-corresponding information, whereby it is possible to reduce the reviewer effort in classification.

The document determination system of the invention includes the classification mark accepting unit which accepts the attachment of a classification mark from the user, includes a function of extracting words which frequently appear in documents, to which a common classification mark is attached by the user, and analyzing the types of the extracted words, an evaluated value of each word, and trend information of the number of appearances of the extracted words per document, and when performing the attachment of the common classification mark to a document having the same trend as the analyzed trend information among documents, for which a classification mark is not accepted by the classification mark accepting unit, can automatically attach a classification mark based on regularity when being classified by the reviewer.

According to the invention, if the document classification system includes a quality checking unit which determines a classification mark to be attached based on the analyzed trend information for a document, to which a classification mark is attached by the user, compares the determined classification mark with the classification mark attached by the user, and tests validity, it is possible to detect an error in the attachment of a classification mark by the user.

According to the invention, if the second classification unit has a function of recalculating the evaluated value of the related term using the calculated score and performing weighting on the evaluated value of the related term which frequently appears in a document, for which the score exceeds a given value, it is possible to achieve the improvement in classification precision each time the document classification system carries out classification processing.

DESCRIPTION OF EMBODIMENTS

[First Embodiment]

Figure 1:
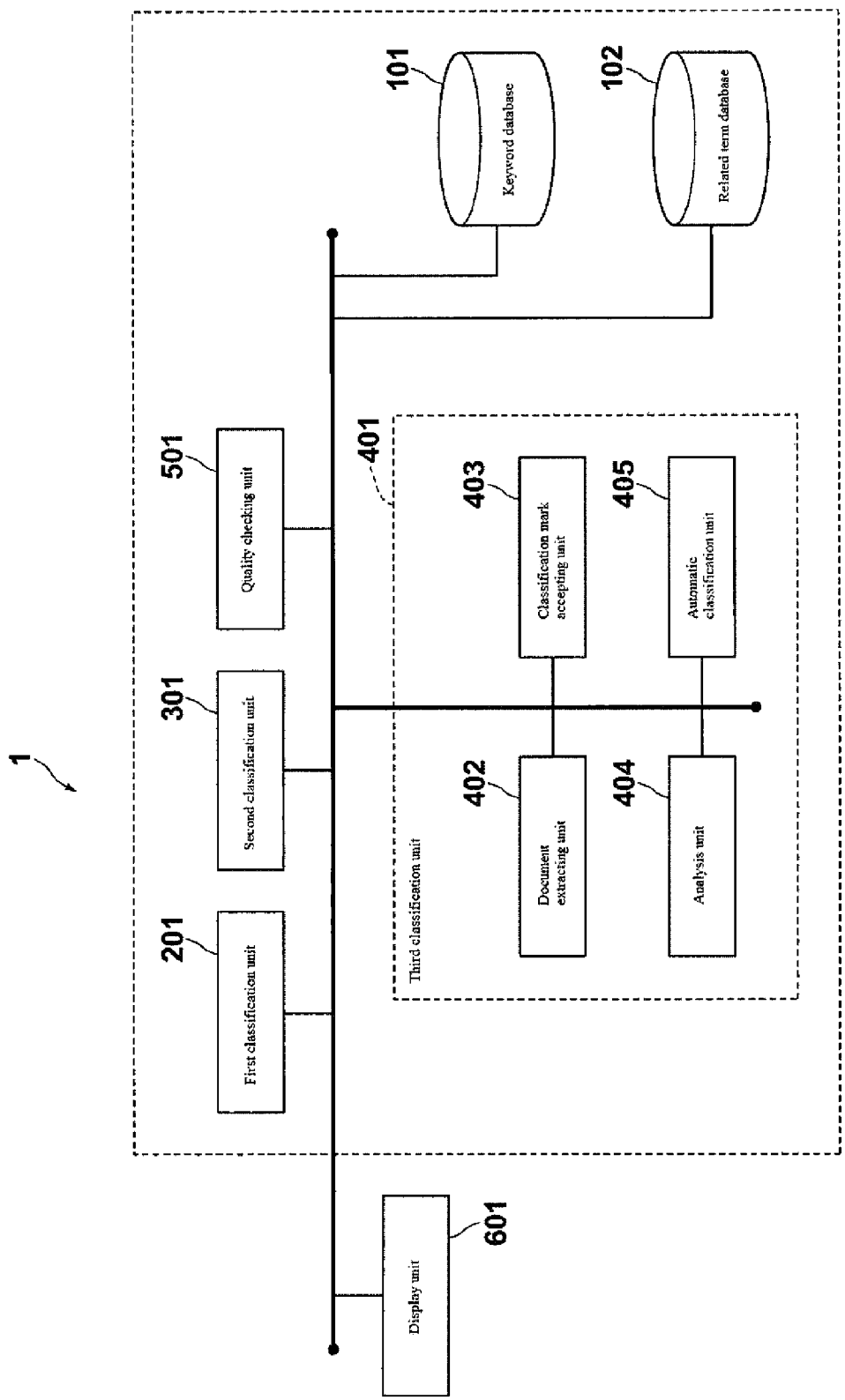
FIG. 1 is a configuration diagram of a document determination system according to a first embodiment of the invention.

Hereinafter, an embodiment of the invention will be described referring to the accompanying drawings. FIG. 1 is a configuration diagram of a document determination system according to a first embodiment.

In order to acquire digital information recorded in a plurality of computers or servers, to analyze document information having a plurality of documents included in the acquired digital information, and to attach a classification mark representing the degree of association with a legal action to the document for ease of use in the legal action, a document classification system 1 of the invention includes a keyword database 101 which records a specific classification mark, a keyword described in a document, to which the specific classification mark is attached, and keyword-corresponding information representing the correspondence relationship between the specific classification mark and the keyword, a related term database 102 which records a predetermined classification mark, a related term having words with a high appearance frequency in the document, to which the predetermined classification mark is attached, and related term-corresponding information representing the correspondence relationship between the predetermined classification mark and the related term, a first classification unit 201 which extracts a document including the keyword recorded in the keyword database 101 from the document information and attaches the specific classification mark to the extracted document based on the keyword-corresponding information, a second classification unit 301 which extracts a document including the related term recorded in the related term database 102 from the document information, to which the specific classification mark is not attached in the first classification unit 201, calculates a score based on an evaluated value of the related term included in the extracted document and the number of related terms, and attaches the predetermined classification mark to a document, for which the score exceeds a given value, among the documents including the related term based on the score and the related term-corresponding information, and a classification mark accepting unit 403 which accepts the attachment of a classification mark from a user to a document, to which the predetermined classification mark is not attached in the second classification unit 301.

In the first embodiment, the document classification system 1 of the invention has a keyword database 101, a related term database 102, a first classification unit 201, a second classification unit 301, a third classification unit 401, and a quality checking unit 501.

In the first embodiment, although the document classification system 1 of the invention does not include a display unit 601 therein, the display unit 601 may be provided in the system.

The third classification unit 401 has a document extracting unit 402, a classification mark accepting unit 403, an analysis unit 404, and an automatic classification unit 405.

The classification mark accepting unit 403 accepts a classification mark, which is attached to document information by the user, as an input from a keyboard or a mouse.

The keyword database 101 and the related term database 102 are recording devices which record data in an electronic medium, and in the first embodiment, are provided in the document classification system 1. As other examples, the keyword database 101 and the related term database 102 may be provided as a storage device outside the document classification system 1.

The document classification system 1 is a computer or a server, and operates as various functional units when a CPU executes a program recorded in a ROM based on various inputs. The display unit 601 has a display function, such as a display, a monitor, or a tablet PC, and is a device which is used when the user performs an operation, confirms document information, and attaches a classification mark.

The document classification system 1 and the display unit 601 are connected together through a wired or wireless network. The document classification system 1 and the display unit 601 may be used in the form of cloud computing.

In the first embodiment, a case will be described where, in order to meet eDiscovery (electronic discovery) in a legal action for patent infringement, documents relating to a product A and a product B as a suspected product are classified.

Here, the product A is an image coding device which performs compression processing by coding on analog data of an image, and has "image coding function", "character superimposition function", and "voice coding function". The product B is an image decoding device which performs decoding processing on an image stream coded by the product A to restore original analog data, and has "decoding function" and "voice decoding device". Technology which is used for coding and decoding is suspect to infringe the patents of other people.

It is assumed that a similar product to the product A is a product a and a similar product of the product B is a product b.

A classification mark refers to an identifier which is used when classifying documents. When document information is used as evidence in a legal action, a classification mark may be attached based on the type of evidence or the degree of association with the legal action. In the first embodiment, as a classification mark, there are three classification marks of "important" representing a document which has a very high degree of association with a legal action and includes important admissibility for evidence, "product A" representing a document which is especially involved in the product A, and "product B" representing a document which is especially involved in the product B.

A document used herein refers to digital information which is submitted as evidence in a legal action and data which includes one or more words. As an example of a document, an electronic mail, a presentation material, a spreadsheet material, a meeting material, a contract, an organization chart, a business plan, or the like may be used. Scan data may be handled as a document. In this case, an OCR (Optical Character Reader) device may be provided in the document determination system so as to convert scan data to text data. Change to text data by the OCR device allows a keyword and a related term to be analyzed or extracted from scan data.

A word refers to a set of minimum character string having a meaning in a certain language. For example, a sentence "A document refers to data including one or more words." includes words of "document", "one", "or more", "words", "including", "data", and "refers to".

A keyword refers to a combination of one or a plurality of words. In particular, if a keyword which has a close relationship with a specific classification mark is included in a document, this indicates that a classification mark is determined uniquely. In the first embodiment, a keyword of the classification mark "important" suggests that the document is a document which should be submitted based on eDiscovery (electronic discovery). Specifically, "patent publication number", "patent attorney", "infringer", and the like may be used. If these keywords are included, the document has very high admissibility for evidence in the legal action for patent infringement in the first embodiment.

Keyword-corresponding information represents the correspondence relationship between a keyword and a classification mark. For example, in the first embodiment, the keyword-corresponding information indicates information which manages two pieces of information of the classification mark "important" and the keyword "infringer" having a close relationship in association with each other. Specifically, a keyword having a close relationship with the classification mark "important" and a keyword having a close relationship with the classification mark "product A" are managed on a management table for each classification mark in the keyword database 101. The keyword-corresponding information indicates one record which is recorded in the management table.

A related term refers to a word, for which the evaluated value is equal to or greater than a given value, among words with a high appearance frequency in all documents, to which a predetermined classification mark is attached. In the first embodiment, the appearance frequency refers to the ratio of a related term among the total number of words which appear in one document. An evaluated value refers to the amount of information of each word which is exhibited in a certain document, and may be calculated using the amount of transmitted information.

In the first embodiment, when extracting a document to which the classification mark "product A" is attached, a related term is the name of a technical field to which the product A belongs, the country of sale of the commodity, similar commodity names, and the like, specifically, "coding processing", "Japan", "product a", and the like. When extracting a document to which the classification mark "product B" is attached, similarly, a related term is "decoding", "Japan", "product b", and the like.

Related term-corresponding information represents the correspondence relationship between a related term and a classification mark. For example, in the first embodiment, since one of the related terms of the classification mark "product A" is "coding processing", the related term-corresponding information indicates information which manages two pieces of information in association with each other. Specifically, the classification mark "product A" and the related term "coding processing" are managed on a management table in the related term database 102. The related term-corresponding information indicates one record which is recorded in each management table.

A score refers to the quantitative evaluation of the relation with a specific classification mark in a certain document. In the first embodiment, a score is calculated using Expression (1) by words which appear in a document and an evaluated value of each word.

$$\text{Scr} = \Sigma_{i=0}^{N} i*(m_i * \text{wgt}_i^2) / \Sigma_{i=0}^{N} i * \text{wgt}_i^2 \qquad (1)$$

Scr: score of document
$m_i$: appearance frequency of i-th keyword or associated term
$\text{wgt}_i^2$: weight of i-th keyword or associated term In the first embodiment, the keyword database 101 has different management tables for three classification marks of "important", "product A", and "product B". In each management table, a keyword corresponding to each classification mark is recorded along with the keyword-corresponding information.

In the first embodiment, the related term database 102 has different management tables for three classification marks of "important", "product A", and "product B". In each management table, a related term corresponding to each classification mark and a threshold value are recorded along with the related term-corresponding information. If the score calculated based on the related term exceeds the threshold value, the corresponding classification mark is attached to the document.

Figure 3:
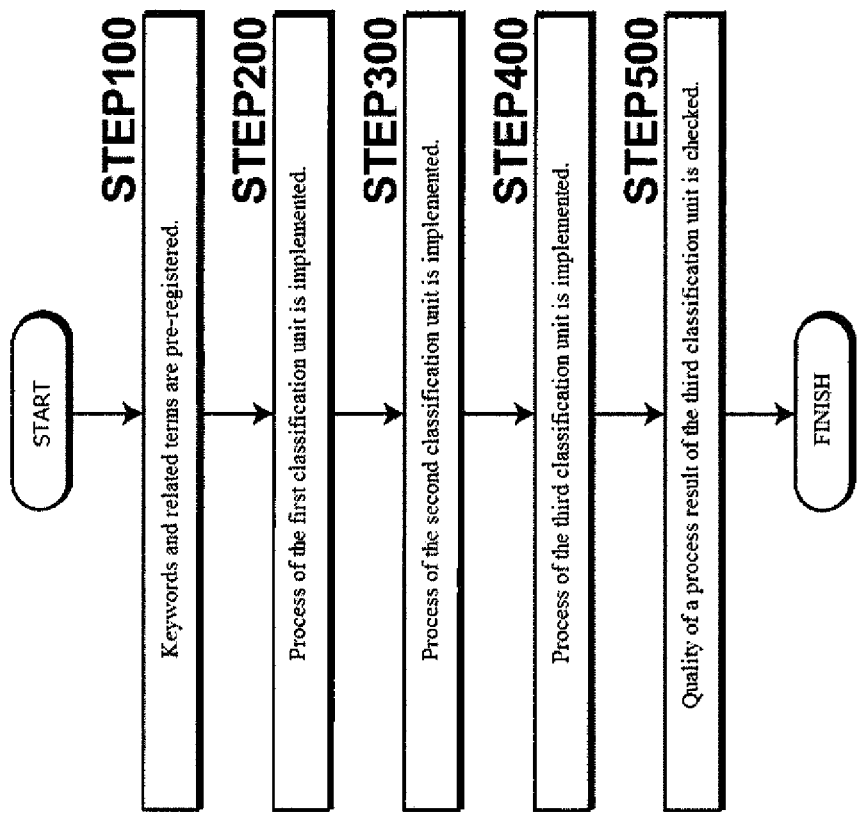
FIG. 3 is a chart showing the flow of processing of each step in an embodiment of the invention.

In the first embodiment, classification processing is performed in five steps according to a flowchart shown in FIG. 3.

In a first step, preliminary recording of a keyword and a related term is performed using the result of previous classification processing (STEP100). At this time, the keyword and the related term are recorded along with-corresponding information with a classification mark.

In a second step, a document including the keyword recorded in the first step is extracted from all pieces of document information, and if the document is found, the classification mark corresponding to the keyword is attached referring to the keyword-corresponding information recorded in the first step (STEP200).

In a third step, a document including the related term recorded in the first step is extracted from document information, to which a classification mark is not attached in the second step, and the score of the document including the related term is calculated. The attachment of the classification mark is performed referring to the calculated score and the related term-corresponding information recorded in the first step (STEP300).

In a fourth step, a classification mark attached by the user is accepted for document information, to which a classification mark is not attached up to the third step. Words which frequently appear in documents, to which a common classification mark is attached by the user, are extracted, the types of the extracted words, an evaluated value of each word, and trend information of the number of appearances of the extracted words per document are analyzed, and the attachment of the common classification mark is performed for a document having the same trend as the trend information (STEP400).

In a fifth step, a classification mark to be attached is determined based on the analyzed trend information for a document, to which a classification mark is attached by the user in the fourth step, the determined classification mark is compared with the classification mark attached by the user, and validity of classification processing is tested (STEP500).

The trend information represents the degree of similarity between each document and a document, to which a classification mark is attached, and is based on the types of words included in each document, the number of appearances, and the evaluated value of each word. For example, if each document and a document, to which a predetermined classification mark is attached, are similar regarding the degree of association with the predetermined classification mark, it is considered that the two documents have the same trend information. Even if the types of words to be included are different from each other, a document which includes words having the same evaluated value with the same number of appearances may be considered as a document having the same trend.

A detailed processing flow in each step will be described below.

<First Step (STEP100)>

Figure 4:
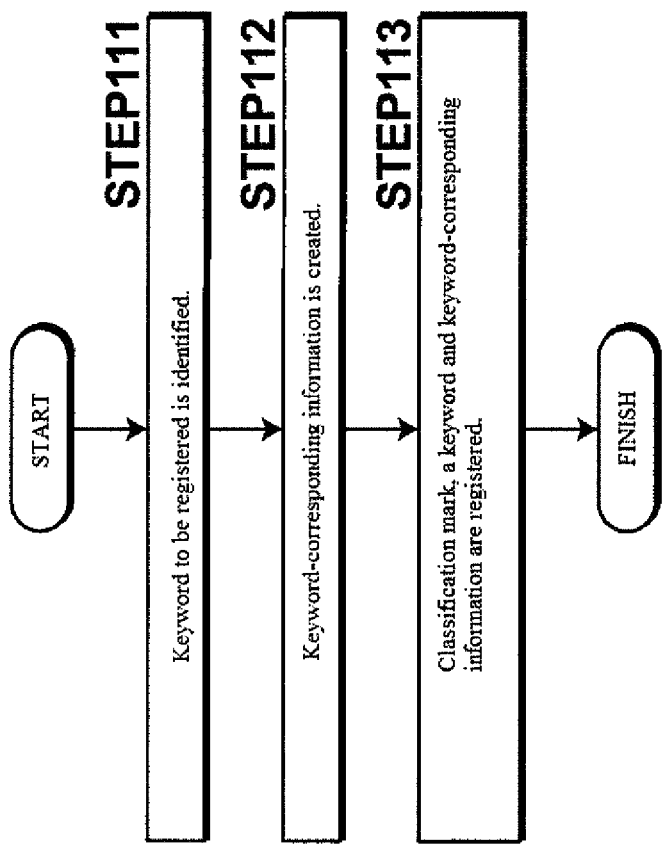
FIG. 4 is a chart showing a processing flow of a keyword database in an embodiment of the invention.

A detailed processing flow of the keyword database 101 in the first step will be described referring to FIG. 4.

The keyword database 101 creates a management table for each classification mark based on the result of classifying documents in previous legal actions and identifies a keyword corresponding to each classification mark (STEP111). In the first embodiment, although the identification is performed by analyzing a document, to which each classification mark is attached, using the number of appearances of each keyword in each document and the evaluated value, a method which uses the amount of transmitted information of a keyword, a method which the user makes a selection manually, or the like may be used.

In the first embodiment, for example, if the keywords "infringement" and "patent attorney" are identified as the keyword of the classification mark "important", keyword-corresponding information representing that "infringement" and "patent attorney" are the keywords having a close relationship with the classification mark "important" is created (STEP112), and is recorded in the management table of the classification mark "important" (STEP113).

Figure 5:
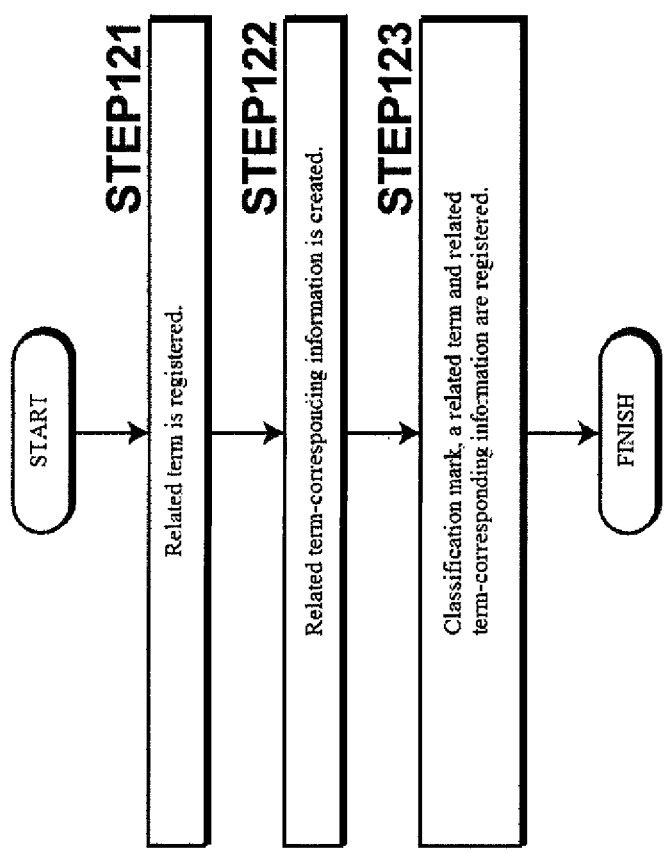
FIG. 5 is a chart showing a processing flow of a related term database in an embodiment of the invention.

A detailed processing flow of the related term database 102 will be described referring to FIG. 5. The related term database 102 creates a management table for each classification mark based on the result of classifying documents in previous legal actions, and records a related term corresponding to each classification mark (STEP121). In the first embodiment, for example, "coding processing" and "product a" are recorded as a related term of "product A", and "decoding" and "product b" are recorded as a related term of "product B".

Related term-corresponding information which represents a classification mark, to which each recorded related term corresponds, is created (STEP122), and is recorded in each management table (STEP123). At this time, the related term-corresponding information also records a threshold value which becomes a score necessary for determining an evaluated value of each related term and a classification mark.

<Second Step (STEP200)>

Figure 6:
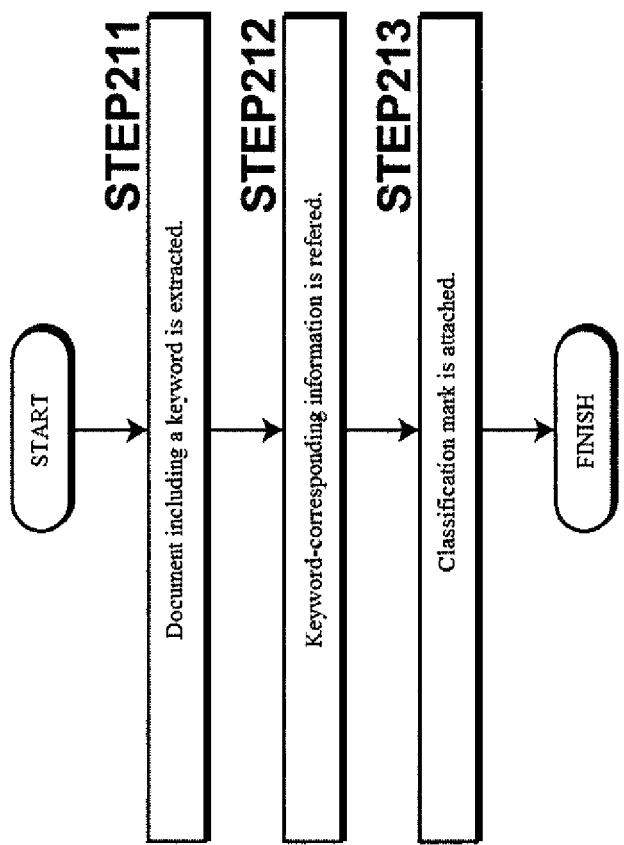
FIG. 6 is a chart showing a processing flow of a first classification unit in an embodiment of the invention.

A detailed processing flow of the first classification unit 201 in the second step will be described referring to FIG. 6. In the first embodiment, in the second step, the first classification unit 201 performs processing for attaching the classification mark "important" to a document.

In the first classification unit 201, a document including the keywords "infringement" and "patent attorney" recorded in the keyword database 101 in the first step (STEP100) is extracted from document information (STEP211). The management table in which the keyword is recorded is referred to from the keyword-corresponding information for the extracted document (STEP212), and the classification mark "important" is attached (STEP213).

<Third Step (STEP300)>

Figure 7:
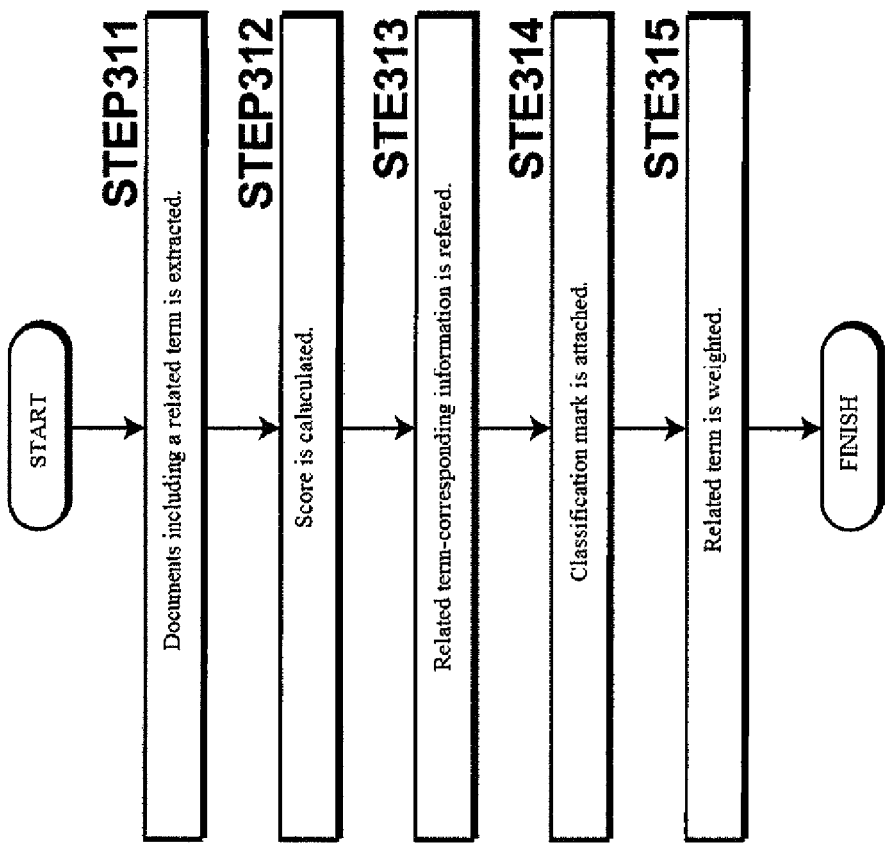
FIG. 7 is a chart showing a processing flow of a second classification unit in an embodiment of the invention.

A detailed processing flow of the second classification unit 301 in the third step will be described referring to FIG. 7.

In the first embodiment, the second classification unit 301 performs processing for attaching the classification marks "product A" and "product B" to document information, to which a classification mark is not attached in the second step (STEP200).

The second classification unit 301 extracts a document including the related terms "coding processing", "product a", "decoding", and "product b" recorded in the related term database 102 in the first step from the document information (STEP311). A score is calculated by Expression (1) based on the appearance frequency of the four recorded related terms and the evaluated value for the extracted document (STEP312). The score represents the degree of association between each document and the classification marks "product A" and "product B".

If the score exceeds the threshold value, the related term-corresponding information is referred to (STEP313), and an appropriate classification mark is attached (STEP314).

For example, if the appearance frequencies of the related terms "coding processing" and "product a" in a certain document and the evaluated value of the related term "coding processing" are high, and the score representing the degree of association with the classification mark "product A" exceeds the threshold value, the classification mark "product A" is attached to the document.

At this time, if the appearance frequency of the related term "product b" in the document is high, and the score representing the degree of association with the classification mark "product B" exceeds the threshold value, "product B" is attached to the document along with the classification mark "product A". If the appearance frequency of the related term "product b" in the document is low, and the score representing the degree of association with the classification mark "product B" does not exceed the threshold value, only the classification mark "product A" is attached to the document.

The second classification unit 301 recalculates the evaluated value of the related term by Expression (2) using the score calculated in STEP432 of the fourth step, and performs weighting on the evaluated value (STEP315).

$$\mathrm{wgt}_{i,L} = \frac{\sqrt{\mathrm{wgt}_{L-i}^2 + \gamma_L \mathrm{wgt}_{i,L}^2 - \theta}}{\sqrt{\mathrm{wgt}_{i,L}^2 + \Sigma_{l=1}^{L}(\gamma_l \mathrm{wgt}_{i,l}^2 - \theta)}} \quad (2)$$

$\mathrm{wgt}_{i,0}$: weight (initial value) of i-th selected keyword before learning
$\mathrm{wgt}_{i,L}$: weight of i-th selected keyword after L-th learning
$\lambda_L$: learning parameter in L-th learning
$\theta$: threshold value of learning effect For example, if a given number or more documents in which the appearance frequency of "decoding" is very high and the score is low by a given value or more are generated, the evaluated value of the related term "decoding" is lowered again and recorded in the related term-corresponding information.

<Fourth Step (STEP400)>

In the fourth step, classification processing is performed for document information, to which a classification mark is not attached in the processing up to the third step. In the first embodiment, in the fourth step, processing for attaching the classification marks of "important", "product A", and "product B" to the document information is performed.

Figure 8:
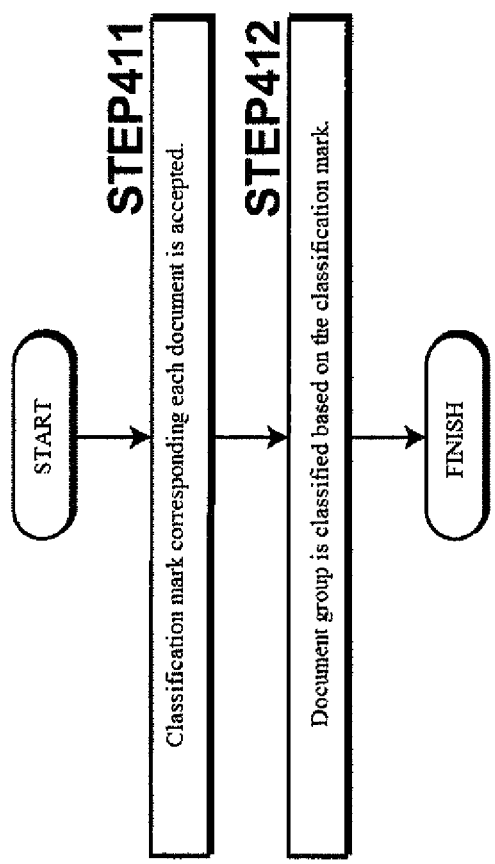
FIG. 8 is a chart showing a processing flow of a classification mark accepting unit in an embodiment of the invention.

A detailed processing flow of the classification mark accepting unit 403 in the fourth step will be described referring to FIG. 8. First, the document extracting unit 402 randomly samples documents from document information to be processed in the fourth step and displays the documents on the display unit 601. In the first embodiment, 20% of documents among the document information to be processed are randomly extracted and subject to be classified by the reviewer. In regard to sampling, a way of extraction which arranges documents in the order of creation date and time or names and selects 30% of documents from above may be used.

Figure 14:
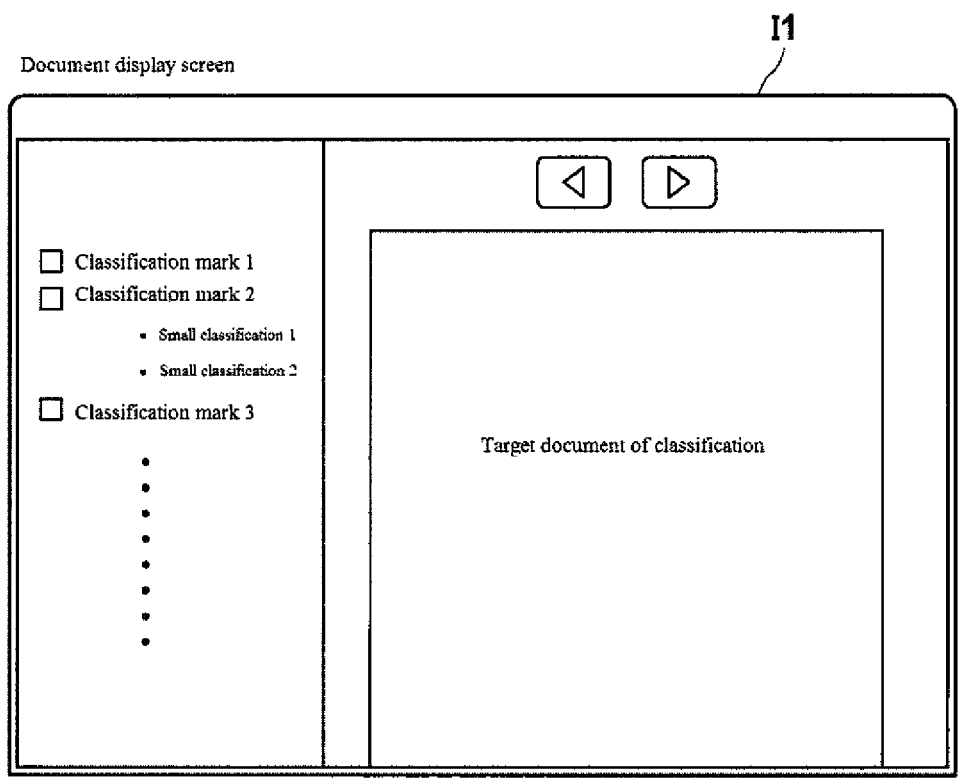
FIG. 14 shows a document display screen in an embodiment of the invention.

The user views a display screen I1 shown in FIG. 14 which is displayed on the display unit 601 and selects a classification mark which is attached to each document. The classification mark accepting unit 403 accepts the classification mark selected by the user (STEP411) and classifies the documents based on the attached classification marks (STEP412).

Figure 9:
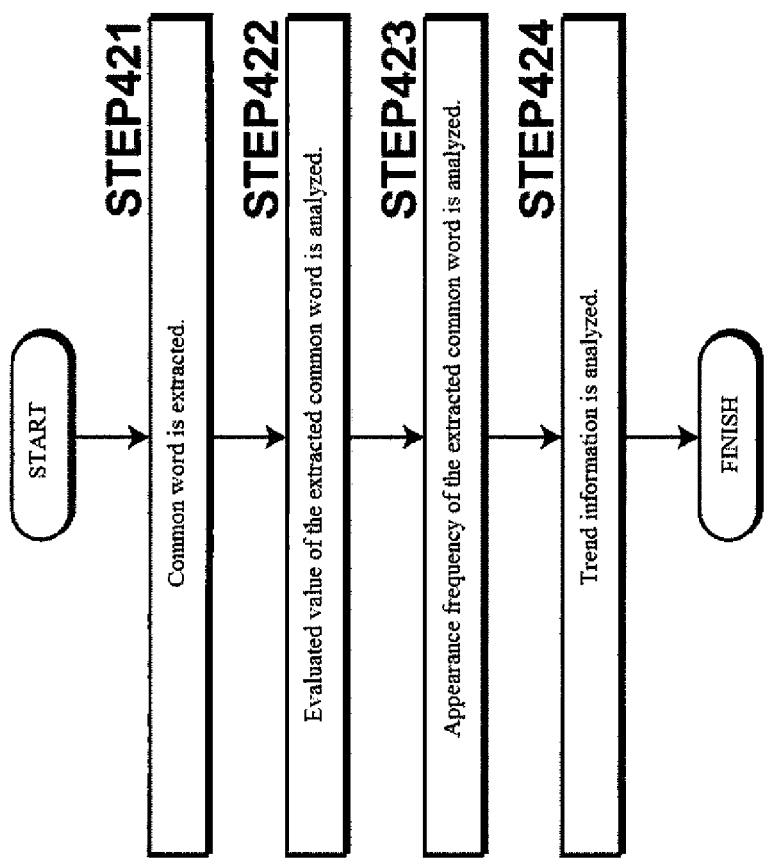
FIG. 9 is a chart showing a processing flow of a analysis unit in an embodiment of the invention.

Next, a detailed processing flow of the analysis unit 404 will be described referring to FIG. 9. The analysis unit 404 extracts a common word which frequently appears in the documents classified by classification mark in the classification mark accepting unit 403 (STEP421). The evaluated value of the extracted common word is analyzed by Expression (2) (STEP422), and analyzes the appearance frequency of the common word in the document (STEP423).

The trend information of a document, to which the classification mark "important" is attached, is analyzed based on the analysis results in STEP422 and STEP423 (STEP424).

Figure 10:
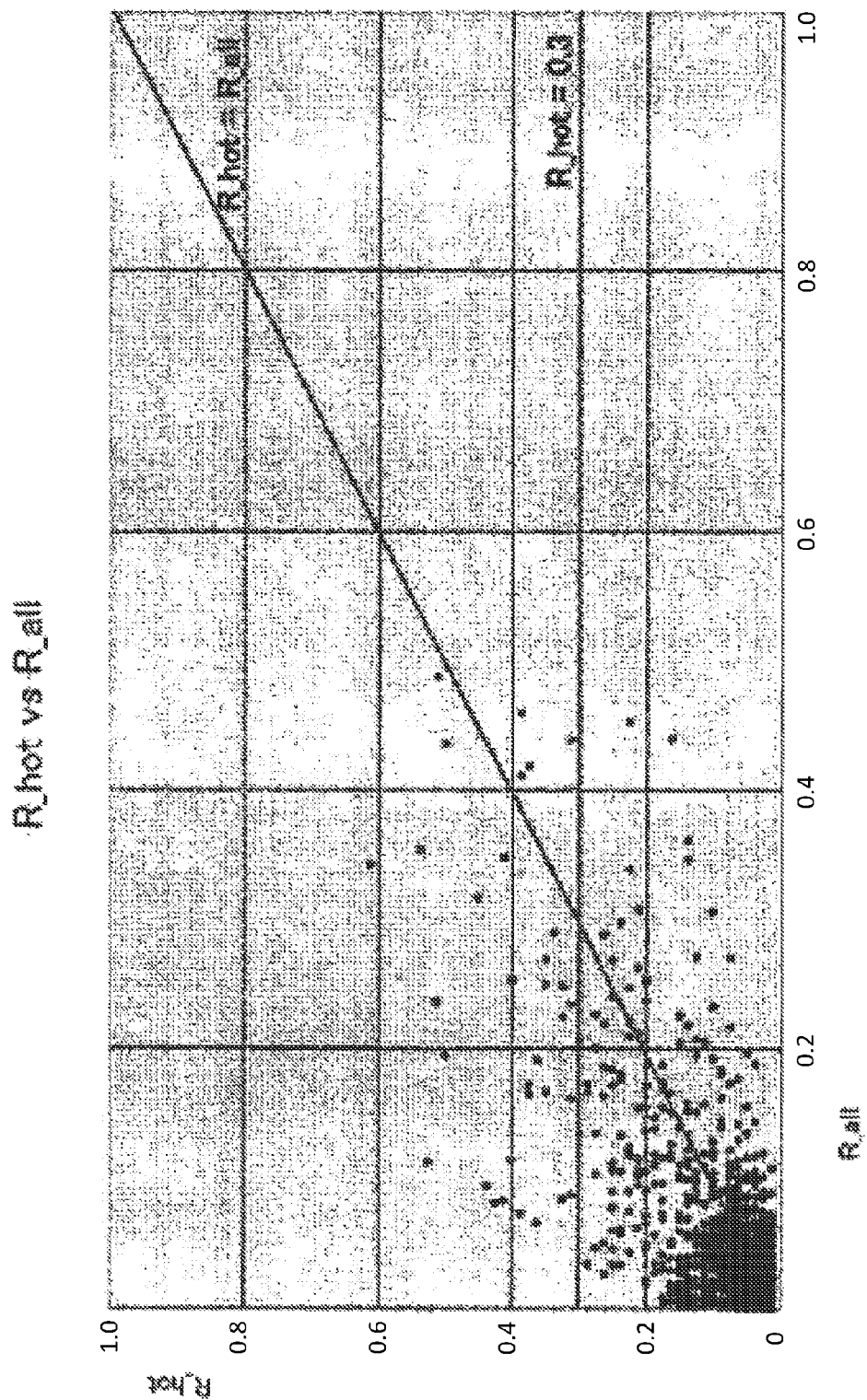
FIG. 10 is a graph showing an analysis result in a analysis unit in an embodiment of the invention.

FIG. 10 is a graph of the result of analyzing a common word which frequently appears in the documents, to which the classification mark "important" is attached, in STEP424.

In FIG. 10, the vertical axis R_hot represents the ratio of documents, which include a word selected as a word associated with the classification mark "important" and to which the classification mark "important" is attached, among all documents, to which the classification mark "important" is attached by the user. The horizontal axis represents the ratio of documents, which includes the word extracted by the classification mark accepting unit 403 in STEP421, among all documents, which are subjected to the classification processing by the user.

In the first embodiment, the classification mark accepting unit 403 extracts a word plotted above the line R_hot=R_all as a common word in the classification mark "important".

The processing of STEP421 to STEP424 is performed for a document, to which the classification marks "product A" and "product B" are attached, and the trend information of the document is analyzed.

Figure 11:
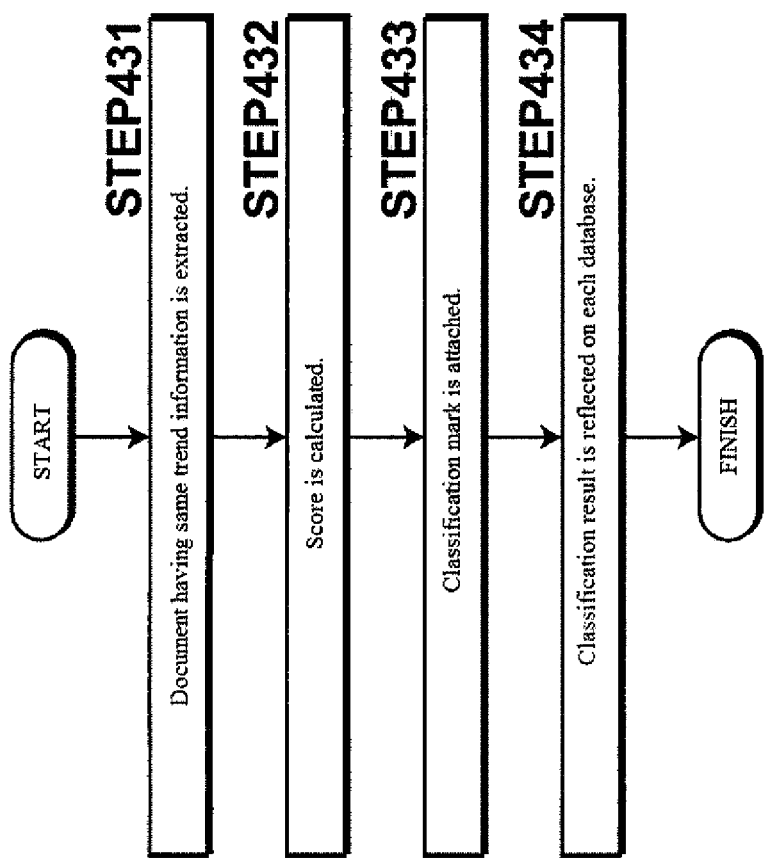
FIG. 11 is a chart showing a processing flow of an automatic classification unit in the first embodiment of the invention.

Next, a detailed processing flow of the automatic classification unit 405 will be described referring to FIG. 11. The automatic classification unit 405 performs processing for documents, for which the attachment of a classification mark is not accepted by the classification mark accepting unit 403 in STEP411, among the document information to be processed in the fourth step. The automatic classification unit 405 extracts a document having the same trend information as the trend information of the document, which is analyzed in STEP424 and to which the classification marks "important", "product A", and "product B" are attached, from the documents (STEP431), and calculates a score using Expression (1) based on the trend information for the extracted document (STEP432). An appropriate classification mark is attached to the document extracted in STEP431 based on the trend information (STEP433).

The automatic classification unit 405 reflects the classification result in each database using the score calculated in STEP432 (STEP434). Specifically, processing is performed for lowering the evaluated values of a keyword and a related term included in a document having a low score and raising the evaluated values of a keyword and a related term included in a document having a high score.

<Fifth Step (STEP500)>

Figure 13:
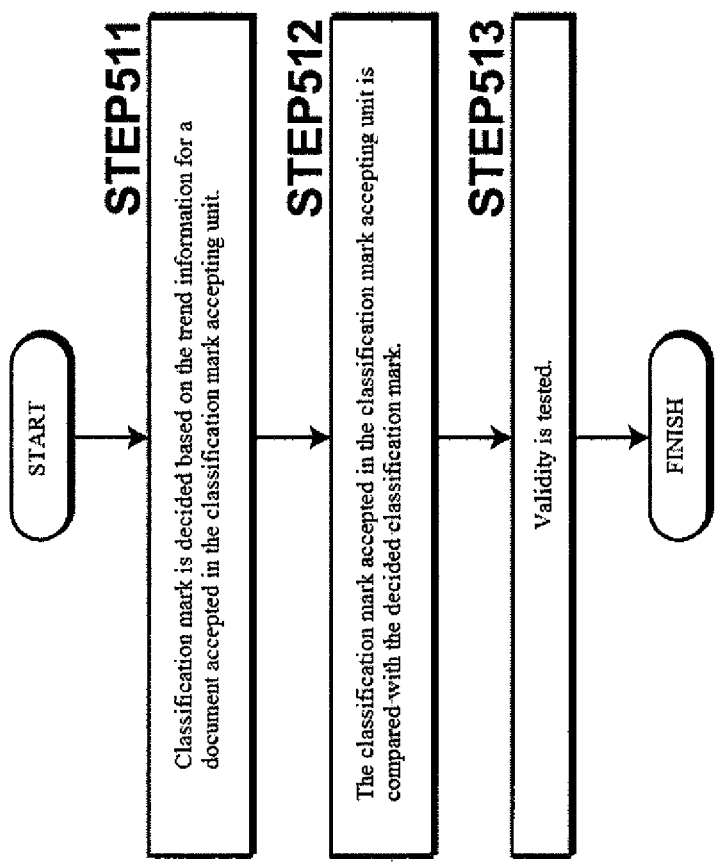
FIG. 13 is a chart showing a processing flow of a quality checking unit in an embodiment of the invention.

A detailed processing flow of the quality checking unit 501 in the fifth step will be described referring to FIG. 13. The quality checking unit 501 determines a classification mark to be attached to a document accepted by the classification mark accepting unit 403 in STEP411 based on the trend information analyzed by the analysis unit 404 in STEP424 (STEP511).

The classification mark accepted by the classification mark accepting unit 403 is compared with the classification mark determined in STEP511 (STEP512), and validity of the classification mark accepted in STEP411 is tested (STEP513).

[Second Embodiment]

Figure 2:
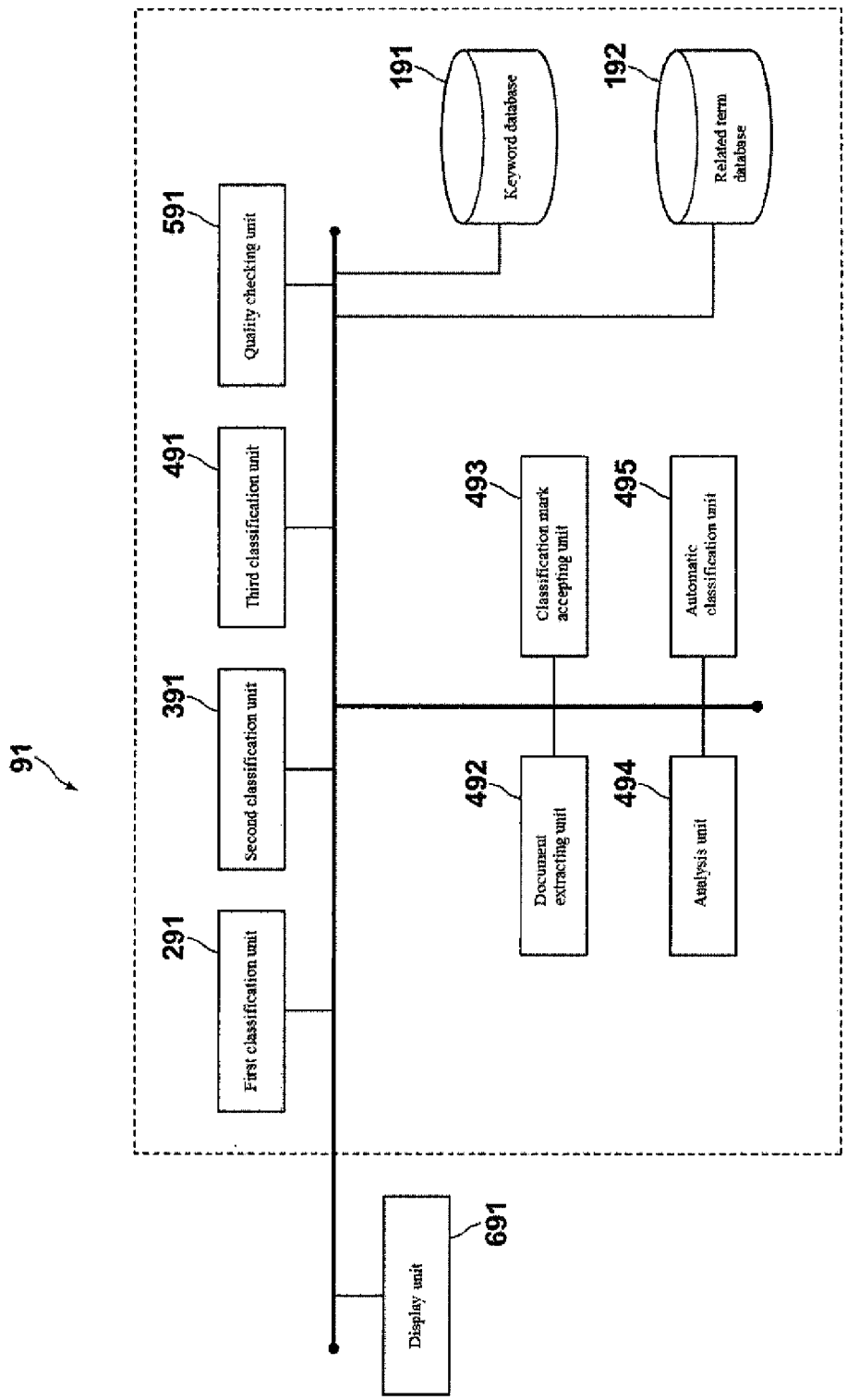
FIG. 2 is a configuration diagram of a document determination system according to a second embodiment of the invention.

Hereinafter, an embodiment of the invention will be described referring to the accompanying drawings. FIG. 2 is a configuration diagram of a document determination system according to a second embodiment.

In the second embodiment, a document classification system 91 of the invention includes a keyword database 191, a related term database 192, a first classification unit 291, a second classification unit 391, a third classification unit 491, a document extracting unit 492, a classification mark accepting unit 493, a analysis unit 494, an automatic classification unit 495, a quality checking unit 591, and the like.

In the second embodiment, although the document classification system 91 of the invention does not include a display unit 691 therein, the display unit 691 may be provided in the system.

The keyword database 191 and the related term database 192 are recording devices which record data in an electronic medium, and in the second embodiment, are provided in the document classification system 91. As other examples, the keyword database 191 and the related term database 192 may be provided as a storage device outside the document classification system 91.

The document classification system 91 is a computer or a server, and operates as various functional units when a CPU executes a program recorded in a ROM based on various inputs. The display unit 691 has a display function, such as a display, a monitor, or a tablet PC, and is a device which is used when the user performs an operation, confirms document information, and attaches a classification mark.

The document classification system 91 and the display unit 691 are connected together through a wired or wireless network. The document classification system 91 and the display unit 691 may be used in the form of cloud computing.

The second embodiment is an example in which, in order to meet an order to submit a document in violation of the Antimonopoly law, documents which should be submitted are classified.

In the second embodiment, as a classification mark, there are two classification marks of "unrelated" representing a document having no admissibility for evidence in a current legal action, and "important" representing a document which has a very high degree of association with a legal action and includes important admissibility for evidence.

As in the first embodiment, a document used herein refers to digital information which is submitted as evidence in a legal action and data which includes one or more words. As an example of a document, an electronic mail, a presentation material, a spreadsheet material, a meeting material, a contract, an organization chart, a business plan, or the like may be used. Scan data may be handled as a document. In this case, an OCR (Optical Character Reader) device may be provided in the document determination system so as to convert scan data to text data. Change to text data by the OCR device allows a keyword and a related term to be analyzed or extracted from scan data.

As in the first embodiment, a word refers to a set of minimum character string having a meaning in a certain language. For example, a sentence "A document refers to data including one or more words." includes words of "document", "one", "or more", "words", "including", "data", and "refers to".

As in the first embodiment, a keyword refers to a combination of one or a plurality of words. In particular, if a keyword which has a close relationship with a specific classification mark is included in a document, this indicates that a classification mark is determined uniquely. In the second embodiment, a keyword of the classification mark "important" suggests that the document should be submitted based on eDiscovery (electronic discovery). Specifically, "cartel", "collusion", and the like may be used. If these keywords are included, the document has very high admissibility for evidence in the second embodiment.

As in the first embodiment, keyword-corresponding information represents the correspondence relationship between a keyword and a classification mark. For example, in the second embodiment, the keyword-corresponding information indicates information which manages two pieces of information of the classification mark "important" and the keyword "collusion" having a close relationship in association with each other. Specifically, a keyword having a close relationship with the classification mark "important" is managed on a management table on the keyword database 191. The keyword-corresponding information indicates one record which is recorded in each management table.

As in the first embodiment, a related term refers to a word, for which the evaluated value is equal to or greater than a given value, among words with a high appearance frequency in all documents, to which a predetermined classification mark is attached. In the second embodiment, the appearance frequency refers to the ratio of a related term among the total number of words which appear in one document. An evaluated value refers to the amount of information of each word which is exhibited in a certain document, and may be calculated using the amount of transmitted information.

In the second embodiment, when extracting a document to which the classification mark "important" is attached, a related term is a person in charge of a transaction which is suspected of violation of the Antimonopoly law, a company name of a transaction partner, or the like specifically, "person A in charge" as the name of the person in charge, "company B" as a transaction partner, or the like.

As in the first embodiment, related term-corresponding information represents the correspondence relationship between a related term and a classification mark. For example, in the second embodiment, since one of the related terms of the classification mark "important" is "person A in charge", the related term-corresponding information indicates information which manages two pieces of information in association with each other. Specifically, the classification mark "important" and the related term "person A in charge" are managed on a management table in the related term database 192. The related term-corresponding information indicates one record which is recorded in each management table.

As in the first embodiment, a score refers to the quantitative evaluation of the relation with a specific classification mark in a certain document. In the second embodiment, as in the first embodiment a score is calculated using Expression (1) by words which appear in a document and an evaluated value of each word.

In the second embodiment, the keyword database 191 has different management tables for the classification mark "important". In each management table, a keyword corresponding to each classification mark is recorded along with the keyword-corresponding information.

In the second embodiment, the related term database 192 has a management table for the classification mark "important". In the management table, a related term corresponding to the classification mark and a threshold value are recorded along with the related term-corresponding information. If the score calculated based on the related term exceeds the threshold value, a corresponding classification mark is attached to the document.

In the second embodiment, as in the first embodiment, classification processing is performed in five steps based on the flowchart shown in FIG. 3.

In a first step, preliminary recording of a keyword and a related term is performed using the result of previous classification processing (STEP100). At this time, the keyword and the related term are recorded in association with-corresponding information with a classification mark.

In a second step, a document including the keyword recorded in the first step is extracted from all pieces of document information, and if the document is found, the classification mark corresponding to the keyword is attached referring to the keyword-corresponding information recorded in the first step (STEP200).

In a third step, a document including the related term recorded in the first step is extracted from document information, to which a classification mark is not attached in the second step, and the score of the document including the related term is calculated. The attachment of the classification mark is performed referring to the calculated score and the related term-corresponding information recorded in the first step (STEP300).

In a fourth step, a classification mark attached by the user is accepted for document information, to which a classification mark is not attached up to the third step. Words which frequently appear in documents, to which a common classification mark is attached by the user, the types of the extracted words, an evaluated value of each word, and trend information of the number of appearances of the extracted words per document are analyzed, and the attachment of the common classification mark is performed for a document having the same trend as the trend information (STEP400).

In a fifth step, a classification mark to be attached is determined based on the analyzed trend information for a document, to which a classification mark is attached by the user in the fourth step, the determined classification mark is compared with the classification mark attached by the user, and validity of classification processing is tested (STEP500).

As in the first embodiment, the trend information represents the degree of similarity between each document and a document, to which a classification mark is attached, and is based on the types of words included in each document, the number of appearances, and the evaluated value of each word. For example, if each document and a document, to which a predetermined classification mark is attached, are similar regarding the degree of association with the predetermined classification mark, it can be considered that the two documents have the same trend information. Even if the types of words to be included are different from each other, a document which includes words having the same evaluated value with the same number of appearances may be considered as a document having the same trend.

A detailed processing flow in each step will be described below.

<First Step (STEP100)>

A detailed processing flow of the keyword database 191 in the first step will be described referring to FIG. 4.

The keyword database 191 creates a management table for each classification mark based on the result of classifying documents in previous classification processing and identifies a keyword corresponding to each classification mark (STEP111). In the second embodiment, for example, as a keyword of the classification mark "important", the keywords "collusion" and "cartel" are identified. In this case, keyword-corresponding information representing that "collusion" and "cartel" are the keywords having a close relationship with the classification mark "important" is created (STEP112), and is recorded in the management table of the classification mark "important" (STEP113).

A detailed processing flow of the related term database 192 will be described referring to FIG. 5. The related term database 192 creates a management table for each classification mark based on the result of classifying documents in previous legal actions, and records a related term corresponding to each classification mark (STEP121). In the second embodiment, for example, "person A in charge" and "company B" are recorded as a related term of the classification mark "important".

Related term-corresponding information which represents a classification mark, to which each recorded related term corresponds, is created (STEP122), and is recorded in the management table (STEP123). At this time, the related term-corresponding information also records a threshold value which is a score necessary for determining an evaluated value of each related term and a classification mark.

<Second Step (STEP200)>

Figure 12:
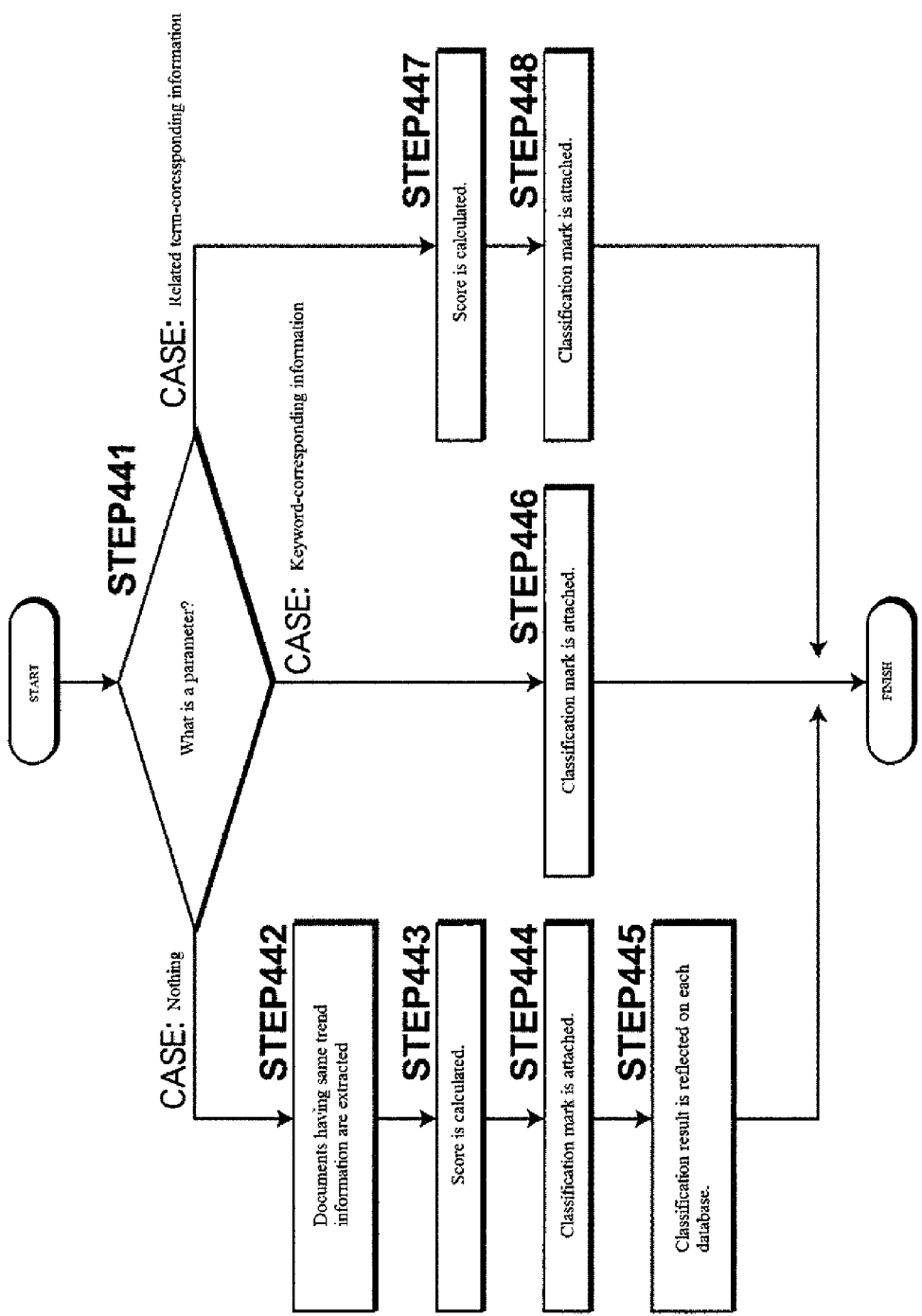
FIG. 12 is a chart showing a processing flow of an automatic classification unit in the second embodiment of the invention.

A detailed processing flow of the first classification unit 291 in the second step will be described referring to FIG. 12. In the second embodiment, in the second step, the first classification unit 291 performs processing for attaching the classification mark "important" to a document.

The first classification unit 291 transfers the keywords "collusion" and "cartel" recorded in the keyword database 191 in the first step (STEP100) to the document extracting unit 492 as a parameter and causes the document extracting unit 492 to extract a document including the keyword from document information. The keyword-corresponding information is transferred to the automatic classification unit 495 as a parameter for the extracted document (STEP441: keyword-corresponding information), and the automatic classification unit 495 refers to the management table in which the keyword is recorded and attaches the classification mark "important" (STEP446).

<Third Step (STEP300)>

A detailed processing flow of the second classification unit 391 in the third step will be described referring to FIG. 12.

In the second embodiment, the second classification unit 391 performs processing for attaching the classification mark "important" to document information, to which a classification mark is not attached in the second step (STEP200), using a related term.

The second classification unit 391 transfers the related terms "person A in charge" and "company B" recorded in the related term database 192 in the first step to the document extracting unit 492 as a parameter and causes the document extracting unit 492 to extract a document including the related term from the document information. The related term-corresponding information is transferred to the automatic classification unit 495 as a parameter for the extracted document (STEP441: keyword-corresponding information), and the automatic classification unit 495 performs processing. Specifically, the second classification unit 391 causes the automatic classification unit 495, which accepts the related term-corresponding information as a parameter, to calculate a score by Expression (1) based on the appearance frequencies of the two related terms and the evaluated value (STEP447). The score represents the degree of association between each document and the classification mark "important".

If the score exceeds a given value, second classification unit 391 causes the automatic classification unit 495 to attach an appropriate classification mark from the related term-corresponding information provided as a parameter (STEP448).

As in the first embodiment, the second classification unit 391 recalculates the evaluated value of the related term by Expression (2) using the score calculated in STEP447 of the fourth step and performs weighting on the evaluated value.

For example, if a given number or more documents in which the appearance frequency of "company B" is very high and the score is low by a given value or more are generated, the second classification unit 391 lowers the evaluated value of the related term "company B" again and records the evaluated value of the related term "company B" in the related term-corresponding information.

<Fourth Step (STEP400)>

In the fourth step, classification processing is performed for document information, to which a classification mark is not attached in the processing up to the third step. In the second embodiment, in the fourth step, processing for attaching the classification mark "important" is performed for the document information.

A detailed processing flow of the classification mark accepting unit 493 in the fourth step will be described referring to FIG. 8. First, the document extracting unit 492 randomly samples documents from document information to be processed in the fourth step and displays the documents on the display unit 691. The user views the display screen I1 shown in FIG. 14 displayed on the display unit 691 and selects a classification mark which is attached to each document. The classification mark accepting unit 493 accepts the classification mark selected by the user (STEP411) and classifies the documents based on the attached classification marks (STEP412).

Next, a detailed processing flow of the analysis unit 494 will be described referring to FIG. 9. A common word which frequency appears in the documents classified by classification mark by the classification mark accepting unit 493 is extracted (STEP421). The evaluated value of the extracted common word is analyzed by Expression (2) (STEP422). The appearance frequency of of the common word in the document is analyzed (STEP423).

The trend information of a document, to which the classification mark "important" is attached, is analyzed based on the analysis results in STEP422 and STEP423 (STEP424).

Next, a detailed processing flow of the automatic classification unit 495 will be described referring to FIG. 12. The automatic classification unit 495 performs processing for documents, for which the attachment of a classification mark is not accepted by the classification mark accepting unit 493 in STEP411, among the document information to be processed in the fourth step. If a parameter is not provided (STEP441: NO), the automatic classification unit 495 extracts a document having the same trend information as the trend information of the document, which is analyzed in STEP424 and to which the classification mark "important" is attached, from the documents (STEP442), and calculates a score using Expression (1) based on the trend information for the extracted document (STEP443). An appropriate classification mark is attached to the document extracted in STEP442 based on the trend information (STEP444).

The automatic classification unit 495 reflects the classification result in each database using the score calculated in STEP443 (STEP445). Specifically, processing is performed for lowering the evaluated values of a keyword and a related term included in a document having a low score and raising the evaluated values of a keyword and a related term included in a document having a high score.

<Fifth Step (STEP500)>

A detailed processing flow of the quality checking unit 591 in the fifth step will be described referring to FIG. 13. The quality checking unit 591 determines a classification mark to be attached to a document accepted by the classification mark accepting unit 493 in STEP411 based on the trend information analyzed by the analysis unit 494 in STEP424 (STEP511).

The classification mark accepted by the classification mark accepting unit 493 is compared with the classification mark determined in STEP511 (STEP512), and validity of the classification mark accepted by the classification mark accepting unit 493 is tested (STEP513).

The document determination system, the document determination method, and the recording medium having recorded thereon the document determination program of the invention include the first classification unit which extracts a document including a keyword recorded in the keyword database from document information and attaches a specific classification mark to the extracted document based on keyword-corresponding information of each keyword, and the second classification unit which extracts a document including a related term recorded in the related term database from the document information, to which a specific classification mark is not attached in the first classification unit, calculates a score based on an evaluated value of the related term included in the extracted document and the number of related terms, and attaches a predetermined classification mark to a document, for which the score exceeds a given value, among the documents including the related term based on the score and related term-corresponding information, whereby it is possible to reduce the reviewer effort in classification.

The document determination system of the invention includes the classification mark accepting unit which accepts the attachment of a classification mark from the user, includes a function of extracting words which frequently appear in documents, to which a common classification mark is attached by the user, and analyzing the types of the extracted words, an evaluated value of each word, and trend information of the number of appearances of the extracted words per document, and when performing the attachment of the common classification mark to a document having the same trend as the analyzed trend information among documents, for which a classification mark is not accepted by the classification mark accepting unit, can automatically attach a classification mark based on regularity when being classified by the reviewer.

According to the invention, if the document classification system includes a quality checking unit which determines a classification mark to be attached based on the analyzed trend information for a document, to which a classification mark is attached by the user, compares the determined classification mark with the classification mark attached by the user, and tests validity, it is possible to detect an error in the attachment of a classification mark by the user.

According to the invention, if the second classification unit has a function of recalculating the evaluated value of the related term using the calculated score and performing weighting on the evaluated value of the related term which frequently appears in a document, for which the score exceeds a given value, it is possible to achieve the improvement in classification precision each time classification processing is carried out.

REFERENCE SIGNS LIST

1, 91: document classification system
201, 291: first classification unit
301, 391: second classification unit
401, 491: third classification unit
402, 492: document extracting unit
403, 493: classification mark accepting unit
404, 494: analysis unit
405, 495: automatic classification unit
501, 591: quality checking unit
601, 691: display unit
101, 191: keyword database
102, 192: related term database
I1: document display screen

The invention claimed is:

1. A document classification system comprising a processing apparatus comprising:
   a document extraction circuitry which extracts a predetermined number of documents as a subject to be classified by a user by sampling the predetermined number of documents from document information;
   a display circuitry which displays a document display screen presenting the user with the extracted documents and one or more classification marks for classifying the documents, enabling the user to select the one or more classification marks to classify the extracted documents;
   a classification mark accepting circuitry which accepts the one or more classification marks attached to each of the displayed document and selected by the user;

a database which records words which appear in common in the documents to which a given classification mark is attached; and a score calculation circuitry which, for each of the documents from the document information, calculates a score which is the evaluation of the relation between the document and the classification mark based on the amount of information which is exhibited by the recorded words in the document.

2. The document classification system according to claim 1, wherein the processing apparatus further comprises:

a classification circuitry which attaches the classification mark to the each of the documents included in the document information based on a regularity of the user's classifying the extracted documents.

3. The document classification system according to claim 2, wherein the classification circuitry extracts the documents that contain the recorded words from the document information, and to each of the extracted documents, attaches a specific classification mark.

4. The document classification system according to claim 3, wherein the classification circuitry extracts a document including a predetermined related term from the documents to which the specific classification mark is not attached and attaches a predetermined classification mark based on the score calculated using the related term included in the extracted document.

5. The document classification system according to claim 4, wherein the classification circuitry attaches the classification mark when the calculated score exceeds a predetermined threshold value.

6. The document classification system according to claim 3, wherein the classification circuitry attaches the classification mark when the calculated score exceeds a predetermined threshold value.

7. The document classification system according to claim 2, wherein the classification circuitry attaches the classification mark when the calculated score exceeds a predetermined threshold value.

8. The document classification system according to claim 1, wherein the score calculation circuitry calculates the score based on a frequency of the words appearing in the document and an evaluated value of each of the words.

9. A document classification method executed by a computer, the method comprising:

extracting a predetermined number of documents as a subject to be classified by a user by sampling the predetermined number of documents from document information;

displaying a document display screen presenting the user with the extracted documents and a classification mark which is an identifier to be used for selection by the user when classifying the documents;

accepting the classification mark attached to the displayed document and selected by the user; and referring to a database which records words which appear in common in the documents to which the classification mark is attached and calculating a score which is the evaluation of the relation between the document and the classification mark based on the amount of information which is exhibited by the recorded words in the document.

10. A non-transitory computer readable recording medium having recorded thereon a set of document classification program code instructions, when executed by the computer, implements:

a document extraction function of extracting a predetermined number of documents as a subject to be classified by a user by sampling the predetermined number of documents from document information;

a display function of displaying a document display screen presenting the user with the extracted documents and a classification mark which is an identifier to be used for selection by the user when classifying the documents;

a classification mark accepting function of accepting the classification mark attached to the displayed document and selected by the user; and a score calculation function of referring to a word database which records words which appear in common in the documents to which the classification mark is attached and calculating a score which is the evaluation of the relation between the document and the classification mark based on the amount of information which is exhibited by the recorded words in the document.

* * * * *